US009130665B2

(12) United States Patent
Baeschlin et al.

(10) Patent No.: US 9,130,665 B2
(45) Date of Patent: Sep. 8, 2015

(54) POWER LINE COMMUNICATION MODEM, POWER LINE COMMUNICATION SYSTEM AND POWER LINE COMMUNICATION METHOD

(71) Applicant: Sony Corporation, Minato-ku (JP)

(72) Inventors: Werner Baeschlin, Oberrohdorf (SE); Andreas Schwager, Waiblingen (DE)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/147,414

(22) Filed: Jan. 3, 2014

(65) Prior Publication Data

US 2014/0119417 A1 May 1, 2014

Related U.S. Application Data

(63) Continuation of application No. PCT/EP2012/001316, filed on Mar. 26, 2012.

(30) Foreign Application Priority Data

Jul. 5, 2011 (EP) .................................... 11005479

(51) Int. Cl.
*H04L 27/28* (2006.01)
*H04B 15/00* (2006.01)
*H04B 3/54* (2006.01)
*H04H 20/84* (2008.01)
*H04L 5/00* (2006.01)

(52) U.S. Cl.
CPC ................. *H04B 15/00* (2013.01); *H04B 3/54* (2013.01); *H04H 20/84* (2013.01); *H04L 5/0007* (2013.01); *H04L 5/0046* (2013.01)

(58) Field of Classification Search
USPC .......................................... 375/259, 260, 295
See application file for complete search history.

(56) References Cited

U.S. PATENT DOCUMENTS

| 7,881,741 | B2 * | 2/2011 | Horiuchi et al. ............... 455/522 |
| 8,611,439 | B2 * | 12/2013 | Karabulut et al. ............ 375/260 |
| 2001/0034851 | A1 * | 10/2001 | Randahl et al. ................ 713/320 |
| 2004/0109499 | A1 | 6/2004 | Cern | |

(Continued)

FOREIGN PATENT DOCUMENTS

| CN | 1723684 A | 1/2006 |
| EP | 1 014 640 A2 | 6/2000 |

(Continued)

OTHER PUBLICATIONS

PCT/FR2010/052561 published on Jun. 3, 2011.*

(Continued)

*Primary Examiner* — Siu Lee
(74) *Attorney, Agent, or Firm* — Oblon, McClelland, Maier & Neustadt, L.L.P.

(57) ABSTRACT

A power line communication modem is provided including a transmitter configured to transmit a power line signal on at least one carrier of a plurality of carriers via a power line to a further power line communication modem; and a processor configured to allocate transmit powers to individual carriers of the plurality of carriers, wherein the sum of the transmit powers of individual carriers located in the first frequency range is below or equal to a first predetermined power maximum value for the first frequency range. A corresponding power line communication system and a power line communication method are provided as well.

19 Claims, 4 Drawing Sheets

(56) References Cited

U.S. PATENT DOCUMENTS

| | | | |
|---|---|---|---|
| 2006/0153309 A1* | 7/2006 | Tang et al. | 375/260 |
| 2008/0025421 A1* | 1/2008 | Tlich | 375/260 |
| 2008/0310457 A1 | 12/2008 | Yamashita et al. | |
| 2010/0195744 A1 | 8/2010 | Schwager et al. | |
| 2011/0080937 A1* | 4/2011 | Kim et al. | 375/219 |
| 2012/0258760 A1* | 10/2012 | Li et al. | 455/522 |
| 2012/0258761 A1* | 10/2012 | Chuang | 455/522 |
| 2012/0319467 A1* | 12/2012 | Andre et al. | 307/1 |

FOREIGN PATENT DOCUMENTS

| | | | | |
|---|---|---|---|---|
| EP | 1 786 115 A1 | | 5/2007 | |
| EP | 2 020 758 A1 | | 2/2009 | |
| GB | 1014640 A2 | * | 6/2000 | H04L 27/26 |

OTHER PUBLICATIONS

International Search Report mailed May 25, 2012 for PCT/EP2012/001316 filed on Mar. 26, 2012 in English.

International Written Opinion mailed May 25, 2012 for PCT/EP2012/001316 filed on Mar. 26, 2012.

Halldorsson et al., "Modulation fuer Powerline", Weka Fachzeitschriften Verlag, Poing, DE, vol. 71, No. 6, XP000774732, Mar. 6, 1998, pp. 56, 58-61.

Schwager et al., "Potential of Broadband Power Line Home Networking", Consumer Communications and Networking Conference, 2005. Second IEEE, XP010787664, Jan. 3, 2005, pp. 359-363.

Combined Chinese Office Action and Search Report issued Sep. 24, 2014 in Patent Application No. 2012800224730 (English language translation only).

* cited by examiner

POWER LINE COMMUNICATION MODEM, POWER LINE COMMUNICATION SYSTEM AND POWER LINE COMMUNICATION METHOD

CROSS-REFERENCE TO RELATED APPLICATIONS

The present application is a continuation application based on PCT/EP2012/001316, filed Mar. 26, 2012 and which also claims priority of EP patent application No. 11 005 479.8 filed on 5 Jul. 2011, the entire contents of each of which are incorporated herein by reference.

The disclosure relates to a power line communication modem, to a power line communication system and to a power line communication method.

BACKGROUND

Power line communication (PLC), also called mains communication, power line transmission (PLT), broadband power line (BPL), power band or power line networking (PLN), is a term describing a method for using power distribution wires for simultaneous distribution of data. A carrier can communicate voice and data by superimposing an analogue signal over standard 50 Hz or 60 Hz alternating current (AC). For indoor applications PLC equipment can use household electrical power wiring as a transmission medium.

Power line communication (PLC) might have interferences to fixed radio broadcasting or other external transmissions. Today, PLC modems or PLC devices have fixed notch filters for amateur radio bands. Filters for fixed notches can be implemented with a high suppression and very steep slopes.

Concepts of dynamic or smart notching enables PLC modems to detect an ingress of fixed radio broadcast stations in the short wave frequency range between 3 MHz and 30 Mhz. The publication ETSI TS 105 578; Power line Telecommunications; "Coexistence between PLT modems and short wave radio broadcasting services"; ETSI 2008 describes an adaptive frequency notching technique, which on the one hand has a minimum impact on data throughput and QoS (Quality of Service) requirements and, on the other hand refuses interference between PLT (Power line telecommunications) and short wave radio broadcast.

Today, PLC modems use the frequency range above 30 MHz only with a very limited power spectral density (PSD). However, in order to achieve higher data rates or coverage, it is envisaged to enable higher feeding limits for PLC in those frequencies. Then there is a high potential to observe interferences from PLC to frequency modulated (FM) radio broadcast.

There is a need to improve the prior art power line communication modems and systems in order to reduce influence on signals transmitted and received in frequency ranges above 30 MHz.

SUMMARY

The object is solved by a power line communication modem, by a power line communication system and a power line communication method according to claims 1, 12 and 13, respectively.

Details of the disclosure will become more apparent from the following description of embodiments in connection with the accompanying drawings.

DETAILED DESCRIPTION OF THE DISCLOSURE

Figure 1:
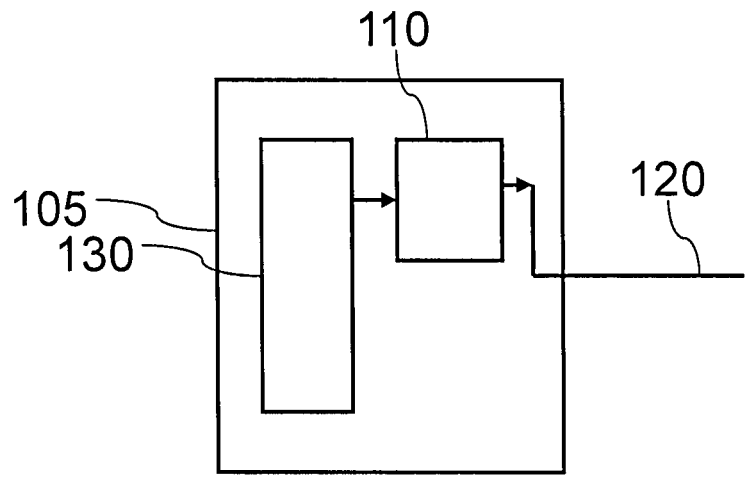
FIG. 1 is a schematic block diagram illustrating a power line communication modem according to an embodiment.

In the following, embodiments of the disclosure are described. It is important to note that all described embodiments in the following may be combined in any way, i.e. there is no limitation that certain described embodiments may not be combined with others In FIG. 1 a schematic block diagram of a power line communication modem 105 is depicted. The power line communication modem 105 includes a transmitter 110 that is adapted to transmit a power line signal on a power line 120 to a not depicted further power line communication modem. The power line signal is transmitted on at least one carrier of a plurality of carriers.

In a PLC system power line signals are generally OFDM (orthogonal frequency division multiplex)-modulated, i.e. a plurality of carriers or sub-carriers is used for transmitting the payload signal. OFDM is a multi-carrier modulation scheme, which uses a large number of closely spaced orthogonal carriers or sub-carriers. Each carrier or sub-carrier is modulated with a conventional modulation scheme (such as quadrature amplitude modulation (QAM)) at a low symbol rate, maintaining data rates similar to conventional single carrier modulation schemes in the same bandwidth. In practice, OFDM signals are generated using a fast Fourier transform (FFT) algorithm. The primary advantage of OFDM over a single carrier scheme is its ability to cope with severe channel conditions—for instance, attenuation of high frequency at a long copper wire, narrow band interference and frequency-selective fading due to multi path transmission, without complex equalization filters. The carriers might be modulated with different constellations in order to use different channel conditions. High constellations might be used when good channel conditions, e.g. a high signal-to-noise ratio (SNR) is available, low constellations might be used for worse channel conditions, e.g. a low SNR.

The power line communication modem 105 further includes a processor 130. The processor 130 is adapted to allocate transmit powers to individual carriers of the plurality of carriers, wherein the sum of the transmit powers of individual carriers located in a first frequency range is below or equal to a first predetermined power maximum value for the first frequency range.

The first predetermined power maximum value might be stored in advance in the power line communication modem 105 (e.g. in a separate storage unit) and is chosen so that the sum of the transmit powers of individual carriers that are used together or used simultaneously is low enough to ensure that the disturbance of reception of radio broadcast in the FM modulated frequency ranges, e.g. between 87 MHz and 108 MHz, is negligible.

The first frequency range is chosen in order to take into account the so-called "out-of-band"-interference, i.e. the first frequency range generally is larger than the frequency range that should not be disturbed. For example, the first frequency range might be above 30 MHz. In this case, the first predetermined maximum power value would provide a limit of transmit power for the sum of all carriers on frequencies above 30 MHz. The sum of transmit powers might also be referred to as "total" transmit power or "total amount" of transmit power in the first frequency range.

In a further embodiment the processor 130 might be further configured to allocate transmit powers to individual carriers of the plurality of carriers located in a second, third or further frequency range, wherein the sum of the transmit power of individual carriers located in the second, third or further frequency range is below or equal to a second, third or further predetermined power maximum value for the second, third or further frequency range.

For instance, the second predetermined maximum value might also be stored in advance in the power line communication modem 105 (e.g. in a not depicted storage unit) and provides a limit for the sum of transmit powers that is allowed for carriers that are used together or simultaneously in the second frequency range. The second frequency range might be, for instance, the frequency range between 87 MHz and 108 MHz, where the FM modulated radio broadcast is located, so that for this particular region, a very low transmit power might be guaranteed.

However, further predetermined power maximum values for further frequency ranges might be defined, stored and taken into account by the processor 130 for allocating the transmit powers of the carriers in the further frequency band. If, for example, a certain frequency range is known to disturb more heavily the radio broadcast, the corresponding predetermined power maximum value for this certain frequency range should be lower than for other frequency ranges with lower disturbance.

Figure 2:
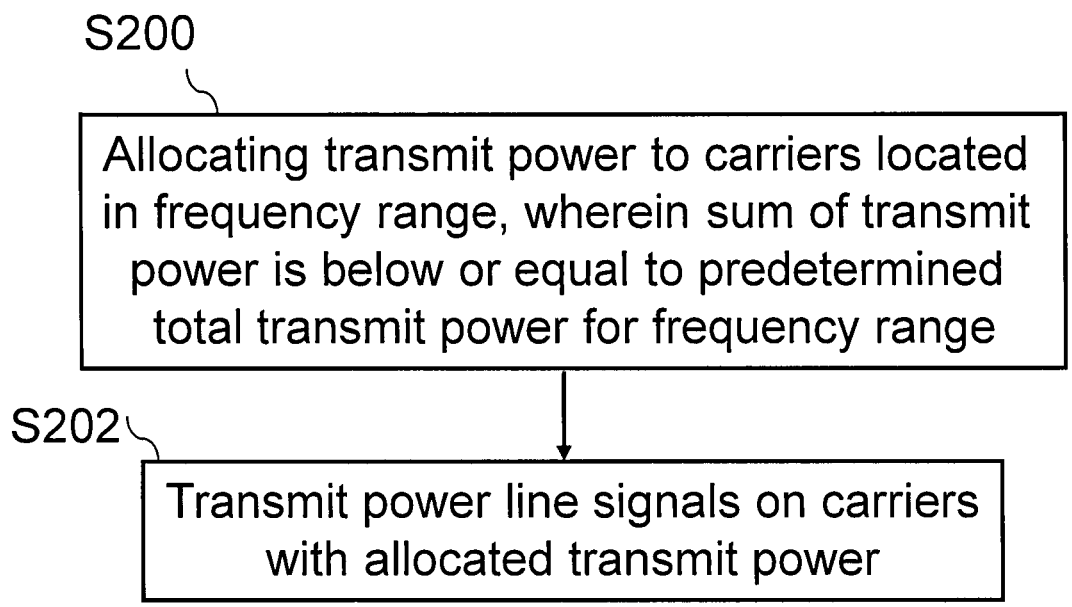
FIG. 2 is a simplified flowchart of a method for operating a power line communication system in accordance with a further embodiment.

A simple flowchart for a corresponding power line communication method is depicted in FIG. 2.

In a step S200 transmit powers to individual carriers of a plurality of carriers is allocated, wherein the sum of the transmit powers of individual carriers located in a first frequency range is below or equal to a first predetermined power maximum value for the first frequency range.

In a step S202 a power line signal is transmitted on at least one carrier of the plurality of carriers via a power line to a power line communication modem with a transmit power as determined in step S200.

Figure 3:
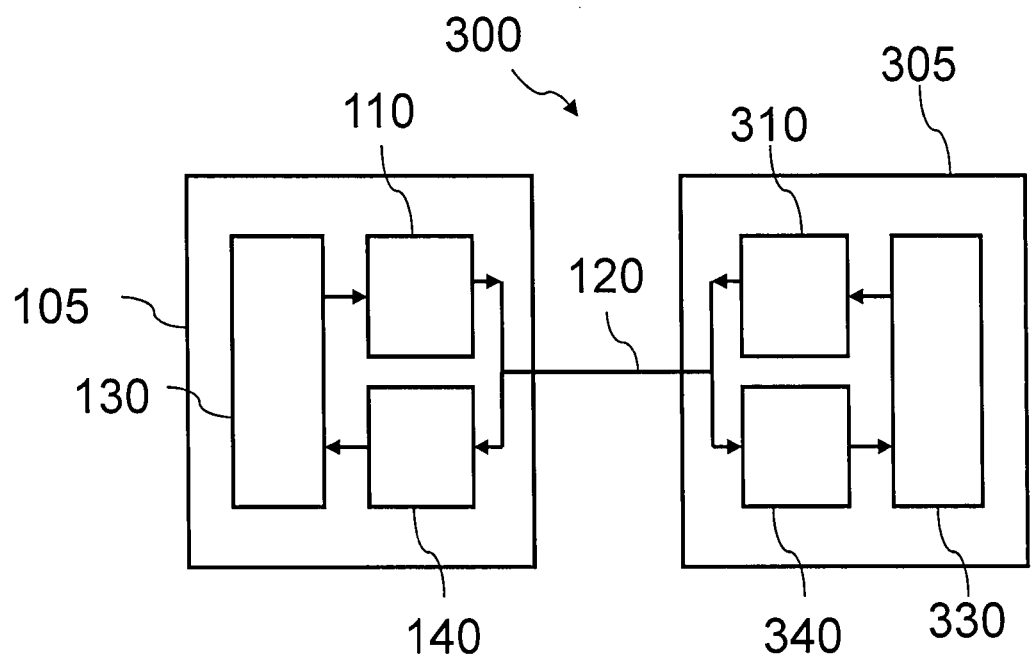
FIG. 3 is a schematic block diagram illustrating a power line communication system according to an embodiment.

In FIG. 3 a schematic block diagram of a power line system 300 according to a further embodiment is depicted. The power line system includes the power line modem 105 and a further power line communication system 305 that are connected via the power line 120. Of course, further power line communication modems connected via the power line 120 or further power lines (not depicted) might be part of the power line system 300 as well.

The further power line communication modem 305 includes also a transmitter 310 that is adapted to transmit power line signals via the power line 120 and a processor 330 that is adapted to allocate the transmit powers of the carriers in the same way as the processor 130 of the power line communication modem 105.

Further, the power line communication modem 105 includes a receiver 140 adapted to receive power line signals that are transmitted from the transmitter 310 of the further power line communication modem 305. The further power line communication modem 305 includes a receiver 340 adapted to receive the power line signals transmitted from the transmitter 110 of the power line communication modem 105.

With the power line communication modem, the power line communication system and the power line communication method it is possible to reduce the disturbance of reception of FM radio broadcast.

Today PLC/PLT/BPL applications are regulated to limit the feeding PSD (Power spectral density) to a certain value, not to create any interferences to devices using the identical frequencies. Today, mainly the frequencies from 2 MHz to 30 MHz are used by PLC. Permanent or dynamic notches are inserted into the allocated PLC spectrum to provide special protection to radio services. When expanding the allowed frequency range for PLC modems above 30 MHz there is the risk to interfere FM radio services. Even if there is a deep notch in the FM radio broadcast spectrum (Band II from 87 MHz to 108 MHz) interferences from PLC might happen.

Figure 4:
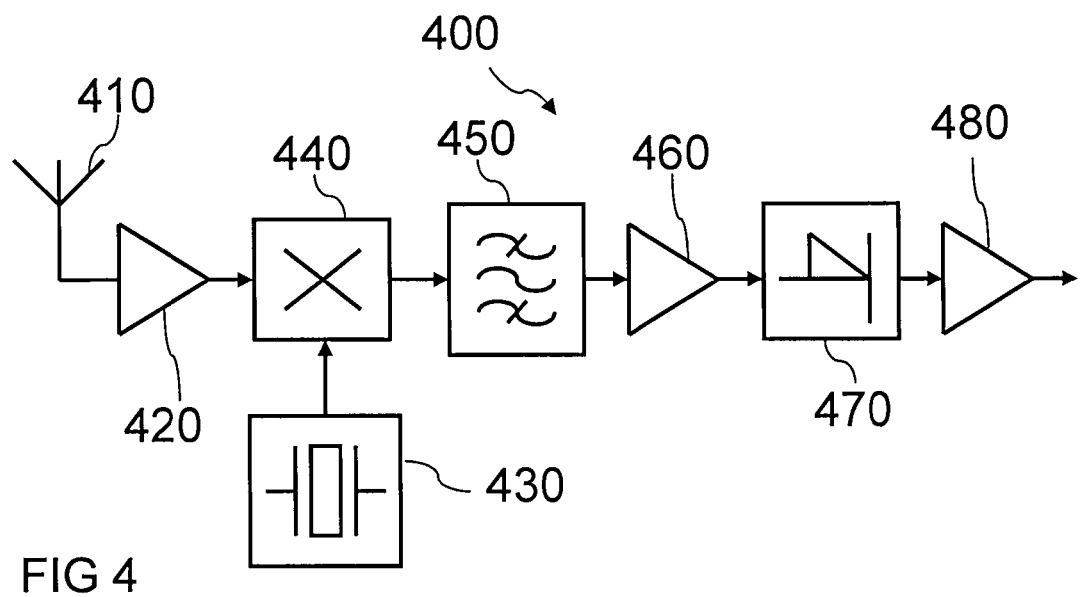
FIG. 4 is a schematic block diagram of a prior art superheterodyne receiver for receiving FM radio broadcast.

FM radio broadcast is generally received via a superheterodyne receiver 400 that is schematically depicted in FIG. 4. The superheterodyne receiver 400 includes an antenna 410, a first amplifier 420, a local oscillator 430, a first mixer 440, a filter 450, a second amplifier 460, a demodulator 470 and a third amplifier 480.

The signal from the antenna 410 is amplified in the first amplifier 420. The local oscillator 430 in the superheterodyne receiver 400 produces a sine wave which mixes in the mixer 440 with that signal, shifting it to a specific intermediate frequency (IF), usually a lower frequency. The IF signal is itself filtered by the filter 450 and amplified by the second amplifier 460. The demodulator 470 uses the IF signal rather than the original radio frequency to recreate a copy of the original modulation (such as audio), which might be amplified by the third amplifier 480.

In principle, prior to the first amplifier 420 only a simple filtering to reject an image frequency might be performed, but the major filtering step is performed by the filter 450 in the intermediate frequency range. Hence, the first amplifier 420 as well as the mixer 440 receives signals that are outside of the frequency range for FM radio broadcast reception ("out-of-band"). Those out-of-band signals captured by the antenna 410 might overload the first amplifier 420 or the mixer 440 so that reception of FM radio broadcast is disturbed.

Figure 5:
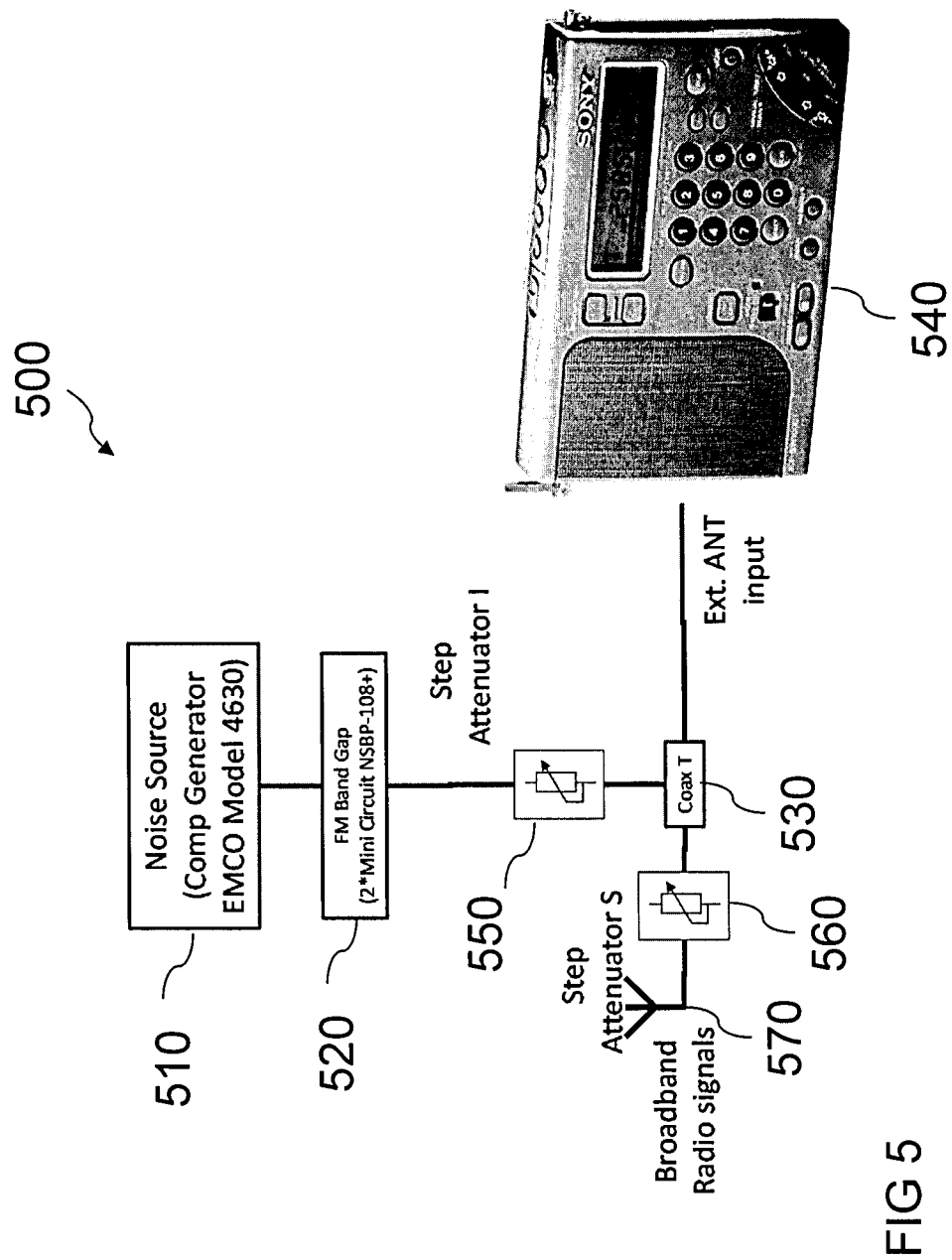
FIG. 5 is a schematic block diagram of a test arrangement for evaluating the influence of out of band PLC interference to FM radio reception.

Even if the FM frequencies are notched by PLC, interferences to FM radio reception are noticeable. The experiment setup 500 depicted in FIG. 5 can be used to describe this effect.

A noise generator 510 (representing a PLC modem) feeds energy. An FM band gap filter 520 removes all energy within FM frequencies. The out of band energy is added to a radio broadcast signal in a coaxial T connector 530 and forwarded to an external antenna input of an FM radio receiver 540. A first step attenuator I 550 is connected between the FM band gap filter 520 and the coaxial T connector 530 and a second step attenuator S 560 is connected between an antenna 570 for receiving the broadband radio signals and the coaxial T connector 530.

The test has been performed as follows:
Tune to any FM radio service (within 87 MHz<f<108 MHz)
Adjust Step Attenuator S 560 to get a sensitive, hardly receivable FM service
Decrease Step Attenuator I 550 until interferences are noticeable in the FM service
Verify level of both signals using a spectrum analyzer.

As a result even if there are no interfering signals in the FM band, degradation of the FM radio quality is noticeable at the radio.

Figure 6:
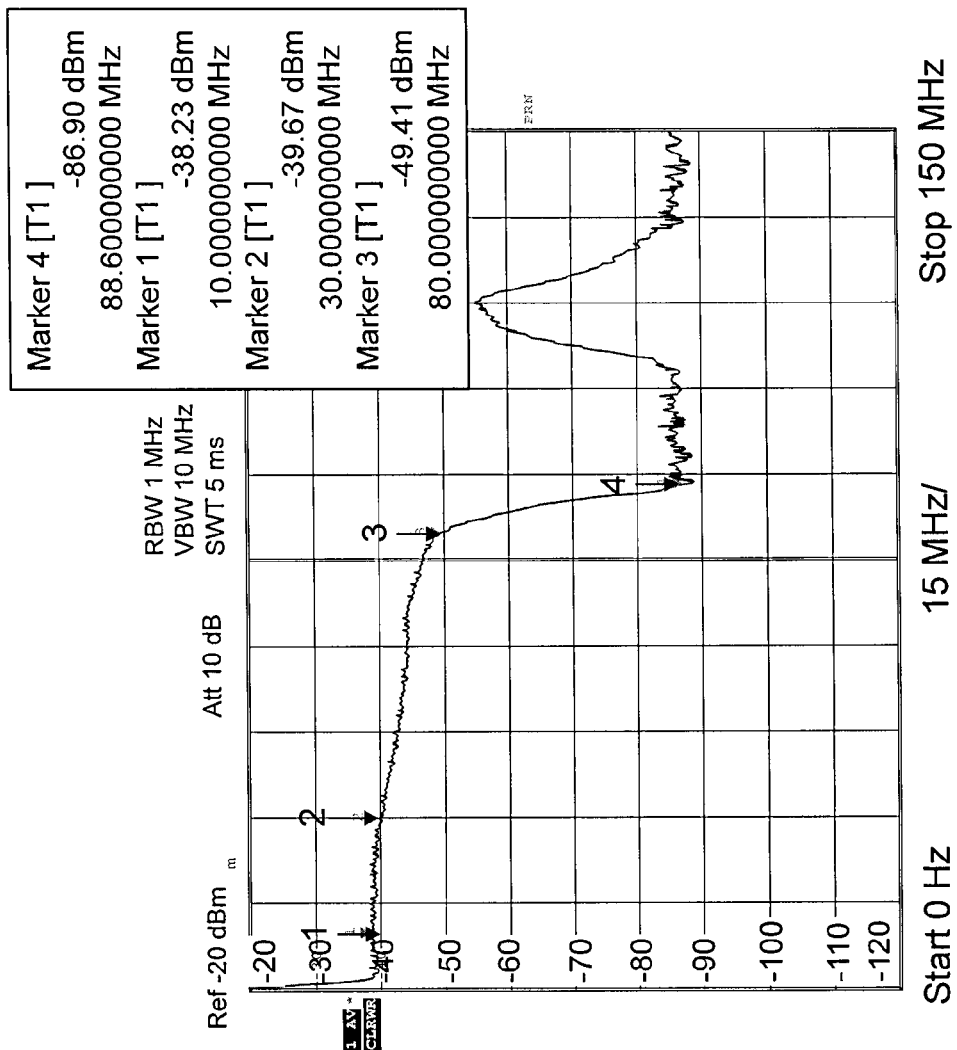
FIG. 6 is a frequency scan depicting the signal used in the test arrangement of FIG. 5 of causing interferences to FM radio reception.

FIG. 6 schematically shows the signal causing interferences to FM radio reception used in the measurement setup 500 signal. Band II (87 MHz to 107 MHz) is notched.

The strong out of band energy in the frequencies below 80 MHz or above 108 MHz causes the unfiltered or broadband reception units (amplifier, mixer, etc.) in the FM radio 540 to overflow.

Hence, the power line communication modem, the power line communication system and the power line communication method according to the embodiments of the disclosure limit the total energy of the out of band emissions from PLC.

Limiting the PSD of the PLC transmissions to a low value is not sufficient, because PLC modems would significantly loose coverage of their applications. A high PSD is needed by PLC to reach all outlets in a home with a high probability. A large allocation of frequencies enables high PLC data throughput rates.

According to a further embodiment, the processor 130, 330 of the power line communication modem 105, 305 might balance—depending on their application and the channels between the modems—between high coverage and data throughput.

When targeting an excellent coverage (guaranteeing a minimum throughput rate on all channels) the processor 130, 330 of the power line communication modem 105, 305 allocates fewer frequencies with a higher PSD.

When targeting a high data-rate e.g. via a short connection in a home the processor 130, 330 of the power line communication modem 105, 305 allocates all frequencies with a reduced PSD.

The total transmit of feed power is controlled to not exceed a given limit, i.e. the predetermined power maximum value P=allocated bandwidth*PSD. The total power limit P is the allocated Bandwidth (BW) times the PSD.

The processor 130, 330 of the power line communication modem 105, 305 might reduce the total allocated spectrum (all carriers) to a lower PSD or it might reduce the PSD only of some carriers.

According to a further embodiment, the processor 130, 330 might determine channel conditions for the carriers on the power lines 120 in the network by evaluating received power line signals at the corresponding receiver 140, 340. The channel condition might e.g. be a signal-to-noise ration SNR or any other possible channel condition (bit error rate, etc.).

The processor 130, 330 can use the channel condition itself for allocating transmit powers to carriers, when transmitting power signals to other power line communication modems. Further, the channel conditions might be fed back via the transmitter to the other power line communication modems in the power line system, so that those other power line communication modems might take into account the fed back channel conditions as well.

In a further embodiment the processor 130, 330 is further configured to reduce the transmit power of carriers, for which the received channel conditions indicates that the received channel condition is better than necessary for receiving a maximum OFDM constellation at the further power line communication modem 305. Carriers having a better SNR than a maximum possible OFDM constellation needs might be reduced without the loss of data rates.

In a further embodiment the processor 130, 330 is further configured to reduce the transmit power of carriers for which the received channel condition indicates that a received power level at the receiver is higher than for the other carriers. Carriers having a high level at the receiver (due to the variable attenuation of the fading channel) might be reduced at the transmitting side in order to generate a flat frequency spectrum at the receiver. As consequence the receiving PLC modem might boost the gain of a receiving amplifier to get a channel with increased SNR for all carriers. The receiver's automatic gain control (AGC) might use a higher value without generating clipping.

In a further embodiment the processor 130, 330 is further configured to omit carriers (i.e. allocate a transmit power of zero to those carriers), for which the received channel condition indicates that the channel condition is less than enough for receiving a lowest possible OFDM constellation at the further power line communication modem 305. Carriers received with such low signal level where the SNR is less than required by the lowest possible constellation, those carriers may be omitted. Omitting them reduces the feeding energy but not the throughput rates.

In a further embodiment the processor 130, 330 is further configured to omit carriers (i.e. allocate a transmit power of zero to those carriers) for which the received channel condition indicates that the channel condition is worse than for other carriers. Consequently, the carriers with less SNR, providing low bit-loading and throughput should be omitted before the high bit-loaded carriers are omitted to optimize data throughput.

The total energy or power to be fed might be individual for each frequency band depending on the radio receiver's reception quality. For instance, the carriers in the frequency range between 80 MHz and 87 MHz might have a lower allocated total power than carriers in the frequency range from 73 MHz to 80 MHz in the case the radio receiver is more sensitive to out of band interference at frequencies closer to the FM radio spectrum.

There might be an individual limit to the PLC signals feed in to frequency ranges above the FM radio spectrum (f>107 MHz).

The invention claimed is:

1. A power line communication modem comprising:
   a transmitter configured to transmit a power line signal on at least one carrier of a plurality of carriers via a power line to a further power line communication modem; and
   a processor configured to allocate transmit powers to individual carriers of the plurality of carriers, wherein the sum of the transmit powers of individual carriers located in a first frequency range is below or equal to a first predetermined power maximum value for the first frequency range and the transmit powers are determined based on a radio broadcast disturbance value of the first frequency range.

2. The power line communication modem according to claim 1, wherein the first frequency range is above 30 MHz.

3. The power line communication modem according to claim 1, wherein the processor is further configured to allocate transmit powers to individual carriers of the plurality of carriers located in a second, third or further frequency range, wherein the sum of the transmit powers of individual carriers located in the second, third or further frequency range is below or equal to a second, third or further predetermined power maximum value for the second, third or further frequency range.

4. The power line communication modem according to claim 3 wherein the second frequency range is between 87 MHz and 108 MHz.

5. The power line communication modem according to claim 1, wherein the processor is further configured to allocate the same transmit powers to all of the carriers.

6. The power line communication modem according to claim 1, wherein the processor is further configured to allocate a reduced transmit power to a subset of all of the carriers.

7. The power line communication modem according to claim 6, further comprising a receiver configured to receive power line signals from the further power line communication modem, wherein the processor is further configured to determine channel conditions for the carriers based on the received power line signals.

8. The power line communication modem according to claim 7, wherein the processor is further configured to reduce the transmit power of carriers, for which the channel condition indicates that the received channel condition is better than necessary for receiving a maximum OFDM constellation at the further power line communication modem.

9. The power line communication modem according to claim 7, wherein the processor is further configured to reduce the transmit power of carriers for which the channel condition indicates that a received power level at the receiver is higher than for the other carriers.

10. The power line communication modem according to claim 7, wherein the processor is further configured to omit carriers, for which the channel condition indicates that the channel condition is less than enough for receiving a lowest possible OFDM constellation at the further power line communication modem.

11. The power line communication modem according to claim 7, wherein the processor is further configured to omit carriers for which the channel condition indicates that the channel condition is worse than for other carriers.

12. The power line communication system comprising at least two power line communication modems according to claim 1, which are connected via a power line.

13. The power line communication modem according to claim 1, wherein the processor is further configured to identify out of band frequency emissions from the power line communication modem and reduce a total energy allocation for the out of band frequency emissions.

14. The power line communication modem according to claim 1, wherein the processor is further configured to balance between high coverage priorities and data throughput priorities depending on application and channel parameters between the power line communication modem and at least one further power line communication modem.

15. The power line communication modem according to claim 14, wherein the processor is further configured to allocate fewer frequencies than a total number of available frequencies between the power line communication modem and a further power line communication mode with a maximum power spectral density when targeting a minimum throughput rate on all channels.

16. The power line communication modem according to claim 14, wherein the processor is further configured to allocate all frequencies with a reduced power spectral density when targeting a high data rate.

17. A power line communication method comprising:
    allocating transmit powers to individual carriers of a plurality of carriers, wherein the sum of the transmit powers of individual carriers located in a first frequency range is below or equal to a first predetermined power maximum value for the first frequency range; and
    transmitting a power line signal on at least one carrier of the plurality of carriers with the allocated transmit power via a power line to a power line communication modem,
    wherein the transmit power is determined based on a radio broadcast disturbance value of the first frequency range.

18. The power line communication method according to claim 17, further comprising
    allocating transmit powers to individual carriers located in a second frequency range, wherein the sum of the transmit powers of individual carriers located in the second frequency range is below or equal to a second predetermined power maximum value for the second frequency range.

19. The power line communication method according to anyone of claim 17, further comprising:
    determining a channel condition for the individual carriers from the power line communication modem; and
    allocating the transmit powers to the individual carriers based on the channel condition.

* * * * *

UNITED STATES PATENT AND TRADEMARK OFFICE
CERTIFICATE OF CORRECTION

| | | |
|---|---|---|
| PATENT NO. | : 9,130,665 B2 | Page 1 of 1 |
| APPLICATION NO. | : 14/147414 | |
| DATED | : September 8, 2015 | |
| INVENTOR(S) | : Werner Baeschlin et al. | |

It is certified that error appears in the above-identified patent and that said Letters Patent is hereby corrected as shown below:

On the title page, Item (72), the 1$^{st}$ Inventor's Country Code is incorrect. Item (72) should read:

--(72) Inventors: Werner Baeschlin, Oberrohdorf (CH);
                      Andreas Schwager, Waiblingen (DE)--

Signed and Sealed this
Eighth Day of March, 2016

Michelle K. Lee
*Director of the United States Patent and Trademark Office*